Feb. 7, 1928.  1,658,326

V. DAHL

TRANSMISSION DEVICE

Filed Nov. 6, 1926   2 Sheets-Sheet 1

INVENTOR
Valentine Dahl
BY
Kenyon & Kenyon
ATTORNEYS.

Feb. 7, 1928.
V. DAHL
1,658,326
TRANSMISSION DEVICE
Filed Nov. 6, 1926      2 Sheets-Sheet 2
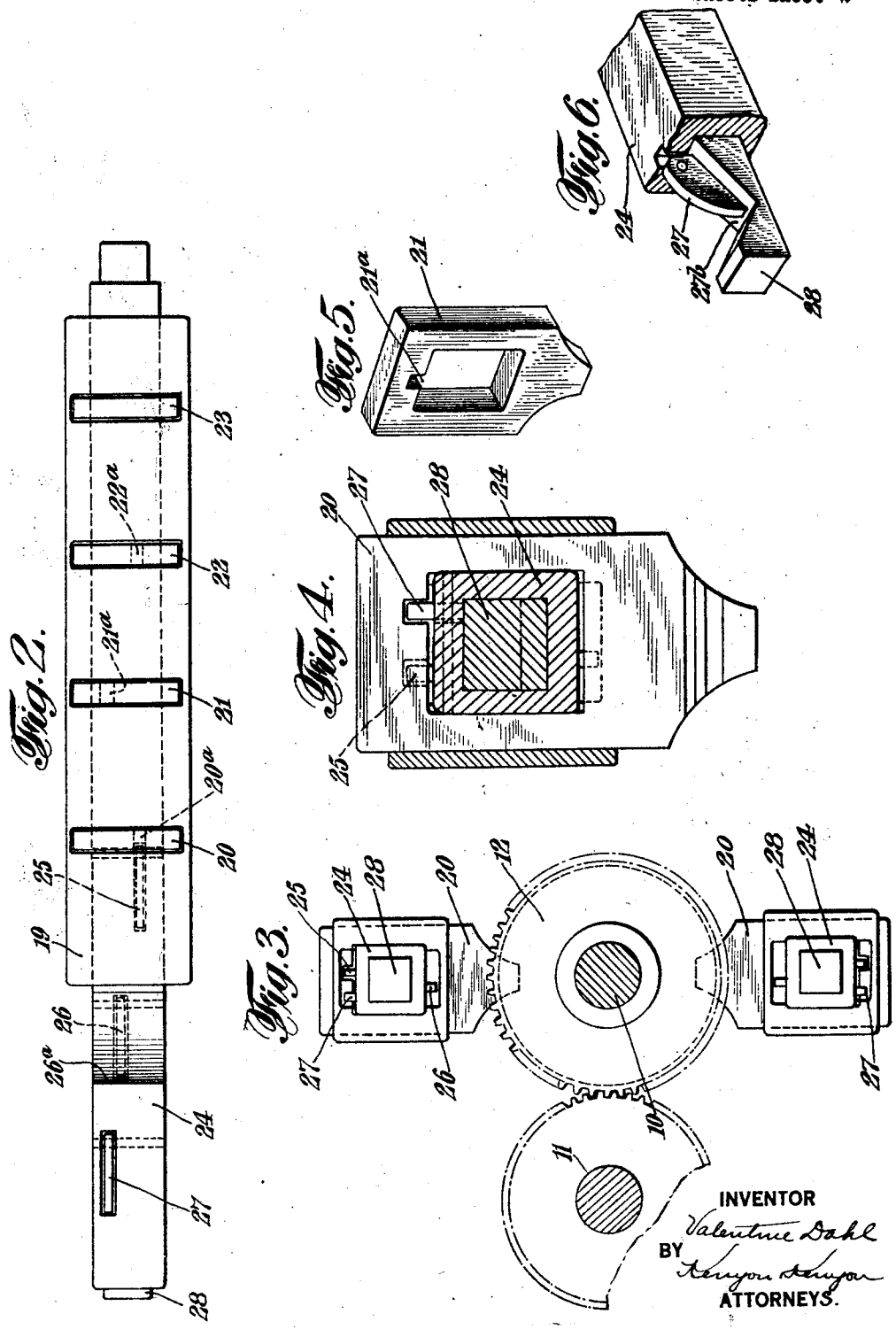
INVENTOR
Valentine Dahl
BY
Kenyon & Kenyon
ATTORNEYS.

Patented Feb. 7, 1928.

1,658,326

UNITED STATES PATENT OFFICE.

VALENTINE DAHL, OF OZONE PARK, NEW YORK.

TRANSMISSION DEVICE.

Application filed November 6, 1926. Serial No. 146,591.

This invention relates to transmission devices, and has for an object a speed change mechanism in which the gears are always in mesh, thereby making it unnecessary to disengage the clutch when shifting gears.

This object may be attained by rotatably mounting a plurality of gears on the driving shaft, these gears being in mesh with coacting gears on the driven shaft and providing between each pair of gears a sleeve slidably keyed to the shaft. Each sleeve is of such length that in one position it is entirely out of engagement with either gear. Teeth are provided on the gears and the sleeve so that the sleeve may be locked to the gear by sliding it into contact therewith. Wedges are provided between the ends of each sleeve and the gears for normally maintaining the sleeve in neutral position. A selector is provided for moving one wedge in and the other out to slide the sleeve into contact with the gear, thereby locking it to the shaft. Means are also provided to render the selector inoperative, if desired. Thus a change from high speed to low speed can be accomplished without going through the intermediate gears.

Other objects, novel features and advantages of the invention will be apparent from the following specification and accompanying drawings wherein Figure 1 is a vertical section through a transmission embodying the invention;

Fig. 2 is a detail view of the selector mechanism;

Fig. 3 is an end elevation of the transmission;

Fig. 4 is a section on the line 4—4 of Fig. 1; and

Figs. 5 and 6 are perspective views of details of the mechanism.

Figure 1:
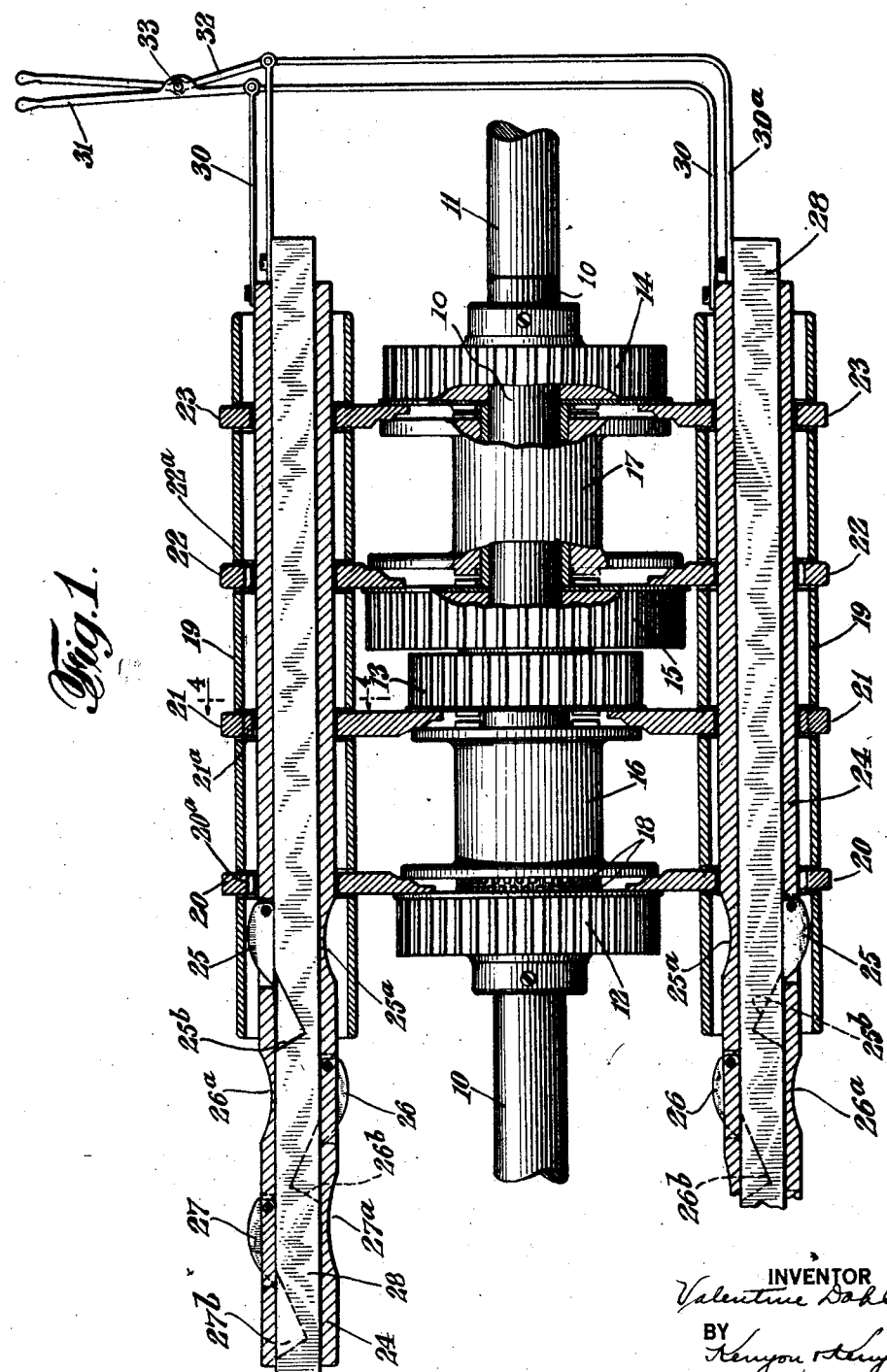

10 designates the driving shaft connected preferably by means of a clutch (not shown) to the crank shaft of an automobile engine, and 11 designates the driven shaft which is connected to the rear axle through a differential or the like. On the shaft 10 are rotatably mounted gears 12, 13, 14 and 15 of different sizes and which are in mesh with coacting gears rigidly mounted on the shaft 11. By selectively locking the gears 12, 13, 14 and 15, the shaft 11 is driven from the shaft 10 at different speeds. To select the proper gear, sleeves 16 and 17 are slidably keyed to the shaft 10 between the gears 12 and 13 and between the gears 14 and 15 respectively. The faces of the sleeves and the co-operating faces of the gears are provided with teeth 18, by means of which the sleeve and either of the co-operating gears may be locked together upon movement of the sleeve toward the gear.

At opposite sides of the shaft 10 are arranged tubular guide members 19. Mounted for movement transversely of the guide members 19 are wedges 20, 21, 22 and 23 respectively. The inner end of each wedge is arranged to project between a collar on the sleeve 16 or 17 and the gear adjacent the collar, normally to hold the teeth 18 out of engagement. The arrangement of each wedge face is such that inward movement of it tends to force the sleeve along the shaft away from the gear adjacent the wedge, thereby engaging the sleeve with the other gear of the pair. These wedges are operated by a selector 24 which comprises a hollow square tube in the upper and lower walls of which are pivotally mounted dogs 25, 26 and 27, these dogs being mounted out of alignment with each other. The wedges are provided with square apertures of approximately the same cross-section as the exterior of the selector 24, and the latter is recessed opposite the dogs as at $25^a$, $26^a$ and $27^a$ so that, when the selector is moved, the wedges will be operated inwardly or outwardly through contact with the dogs 25, 26 and 27. The wedges 20 and 22 are provided with slots $20^a$ and $22^a$ through which the dog 25 may pass without operating them. The wedge 21 is provided with a slot $21^a$ through which the wedge 27 may pass without operating it. The dogs are normally held in projected position by a bar 28 arranged within the selector 24 and being capable of movement either with the selector 24 or relative thereto. This bar is provided with notches $25^b$, $26^b$ and $27^b$ into which the dogs 25, 26 and 27 may move when the bar 28 is properly positioned with respect to the selector 24. When thus positioned, corresponding movement of the selector 24 and the bar 28 in the same direction does not affect the wedges 20, 21, 22 and 23. The selectors 24 are connected by rods 30 with the end of an operating lever 31, and the bars 28 or neutral selectors are connected through the rods 30ª with the end of an operating lever 32, the levers 31 and 32 being pivoted upon a common pivot 33.

The operation of this device is as follows: Assuming the parts are in the position shown in Fig. 1 with the sleeves 16 and 17 held disengaged from the gears by the wedges 20, 21, 22 and 23 and in which position rotation of the shaft 10 has no effect upon the gears 12, 13, 14 and 15. To obtain first speed, the lever 31 is moved to the left. This moves the selectors 24 and 28 simultaneously to the right, 28 being moved with 24 by engagement of the end thereof with the end of the rod 30ª. The dogs 25, 26 and 27 are in their projected position because of the relative positions of the selectors 24 and 28. The dog 25 passes through the slot 20ª and moves into engagement with the wedge 21 and the dog 26 moves into engagement with the wedge 20, thereby moving the wedge 21 outwardly and and the wedge 21 inwardly. The sleeve 16 is thus moved to the right so that its teeth engage the teeth on the gear 13. Power is now transmitted from the shaft 10 through the sleeve 16, teeth 18, gear 13, and co-operating gear on the shaft 11. Second speed is obtained by moving the selectors further to the right. This brings the dog 27 into engagement with the wedge 20, thereby moving it outwardly, and also brings the dog 26 into engagement with the wedge 21, thereby moving it inwardly so that the sleeve 16 is moved to the left to engage its teeth 18 with the teeth on the gear 12. Power is now transmitted from the shaft 10 through the sleeve 16, gear 12 and cooperating gear on the shaft 11. In the meantime, the dog 25 has passed through the slot 22ª without affecting the wedge 22. Further movement of the selectors to the right shifts into third speed by bringing the dog 26 into engagement with the wedge 22, thereby moving it inwardly, and by also bringing the dog 25 into engagement with the wedge 23, thereby moving it outwardly. The sleeve 17 is thus moved to bring the teeth of the sleeve 18 and the gear 14 into engagement, thereby locking the gear 14 to the shaft 10. Power is thus transmitted from the shaft 10 through the sleeve 17, gear 14 and co-operating gear on the shaft 11. At the same time, the dog 27 passes through the slot 21ª without changing the position of the wedge 21. To attain the fourth or high speed, the selectors are moved still further to the right, thus bringing the dog 26 into engagement with the wedge 23, thereby moving the latter inwardly and also bringing the dog 27 into engagement with the wedge 22, thereby moving the latter outwardly, the wedges 20 and 21 being unaffected. The sleeve 17 is thus moved toward the gear 15 to engage the teeth on the gear 15 and the sleeve 17 so that the gear 15 is locked to the shaft 10. Power is thus transmitted from the shaft 10 through the sleeve 17, teeth 18, gear 15 and co-operating gear on shaft 11. When it is desired to shift from high to low speed without going through the intermediate speeds, the lever 32 is operated to move the neutral selector 28 relative to the selector 24 to bring the notches of 25ᵇ, 26ᵇ and 27ᵇ into alignment with the dogs 25, 26 and 27. The levers 31 and 32 are then simultaneously operated to slide the selectors 24 and 28 to the left. The dogs will rotate into the notches when they engage the wedges, so that the latter will be unaffected. When low speed has been reached, the lever 32 is released and it returns to its normal position relative to 31 under the influence of a suitable spring, thereby moving 28 relative to 24 so that the dogs are again projected.

This arrangement permits changing of speeds without disengaging the clutch and permits the gears to be continuously in mesh. Moreover, this arrangement will permit abolishing the clutch if desired, for the wedges may be so arranged that in normal position they hold the sleeves 16 and 17 away from the gears so that the teeth 18 of the sleeves and gears are disengaged, thereby permitting rotation of the shaft 10 without rotation of the shaft 11. As the sleeves and gears are locked together at any speed selection, the engine may be used as a brake, if desired, as, for example, when going down hill. This is made possible by the interlocking of the teeth 18.

If desired, one of the gears,—for example, 13,—may be operatively related to a gear on the shaft 11 through an intermediate pinion, thereby providing a reversing gear, or, if it is desired to have four speeds in one direction, an additional gear, sleeve and wedges may be provided, for reversely driving the shaft 11 from the shaft 10.

I claim:—

1. In combination, a shaft, gears rotatably mounted thereon, sleeves slidably keyed to said shaft, means on said gears and sleeves for locking one to the other in one position of the sleeve, wedges for sliding said sleeves on the shaft into locking position, and means for selectively operating the wedges.

2. In combination, a shaft, gears rotatably mounted thereon, sleeves slidably keyed to said shaft, means on said gears and sleeves for locking one to the other in one position of the sleeve, wedges for sliding said sleeves on the shaft into locking position, said wedges having apertures, a slidable member passing through said apertures and projections on said member to engage said wedges for selective operation.

3. In combination, a shaft, gears rotatably mounted thereon, sleeves slidably keyed to said shaft, means on said gears and sleeves for locking one to the other in one position of the sleeve, wedges for sliding said sleeves on the shaft into locking position, said wedges having apertures, a slidable member passing through said apertures, and a plurality of projections on said member to engage said wedges, certain of said wedges having slots to receive said projections whereby said wedges are selectively operated.

4. In combination, a shaft, gears rotatably mounted thereon, sleeves slidably keyed to said shaft, means on said gears and sleeves for locking one to the other in one position of the sleeve, wedges for sliding said sleeves on the shaft into locking position, said wedges having apertures, a slidable member passing through said apertures, dogs pivoted to said slidable member, and means for projecting said dogs into position to engage said wedges, said means being capable of movement to permit said dogs to assume an inoperative position.

5. In combination, a shaft, gears rotatably mounted thereon, sleeves slidably keyed to said shaft, means on said gears and sleeves for locking one to the other in one position of the sleeve, wedges for sliding said sleeves on the shaft into locking position, said wedges having apertures, a slidable member passing through said apertures, dogs pivoted to said slidable member, and means for projecting said dogs into position to engage said wedges, said means being capable of movement to permit said dogs to assume an inoperative position, certain of said wedges having slots to receive said dogs whereby the wedges are selectively operated.

6. In combination, a shaft, gears rotatably mounted thereon, sleeves slidably keyed to said shaft, means on said gears and sleeves for locking one to the other in one position of the sleeve, wedges for sliding said sleeves on the shaft into locking position, said wedges having apertures, a tubular slidable member passing therethrough, dogs pivoted in the wall of said member, and a bar arranged in said member for maintaining said dogs in position to engage said wedges, said bar having notches to receive said dogs upon relative movement of said bar and tubular member.

7. In combination, a shaft, gears rotatably mounted thereon, sleeves slidably keyed to said shaft, means on said gears and sleeves for locking one to the other in one position of the sleeve, wedges for sliding said sleeves on the shaft into locking position, said wedges having apertures, a tubular slidable member passing therethrough, dogs pivoted in the wall of said member, and a bar arranged in said member for maintaining said dogs in position to engage said wedges, said bar having notches to receive said dogs upon relative movement of said bar and tubular member, certain of said wedges having slots to receive said dogs whereby the wedges are selectively operated.

8. A selector mechanism comprising a plurality of slides, each slide having an aperture, a reciprocal member passing through said apertures, dogs pivoted to said reciprocal member and means for projecting said dogs into position to engage said slides, said means being capable of movement to permit said dogs to assume an inoperative position.

9. A selector mechanism comprising a plurality of slides, each slide having an aperture, a reciprocal member passing through said apertures, dogs pivoted to said reciprocal member, certain of said slides having slots to receive said dogs whereby said slides are selectively operated.

10. A selector mechanism comprising a plurality of slides, each slide having an aperture, a tubular reciprocal member passing through said aptures, dogs pivoted in the wall of said reciprocal member and a bar arranged in said tubular member for maintaining said dogs in position to engage said slides, said bar having notches to receive said dogs upon relative movement of said bar and tubular member.

11. A selector mechanism comprising a plurality of slides, each slide having an aperture, a reciprocal member passing through said apertures, dogs pivoted to said reciprocal member and means for maintaining said dogs in position to operate said slides.

12. In combination, a reciprocal tubular member, dogs pivoted in the wall of said member, and a bar slidably arranged in said tubular member for maintaining said dogs in projected position, said bar having notches to receive said dogs upon relative movement of said bar and tubular member.

13. In combination, a reciprocal tubular member, dogs pivoted in the wall of said member, a bar slidably arranged in said tubular member for maintaining said dogs in projected position, said bar having notches to receive said dogs upon relative movement of said bar and tubular member, and means for effecting a limited relative movement of said tubular member and bar and additional simultaneous movement thereof.

In testimony whereof, I have signed my name to this specification.

VALENTINE DAHL.